United States Patent
Hoellriegl et al.

(10) Patent No.: US 11,123,913 B2
(45) Date of Patent: Sep. 21, 2021

(54) BLOW MOULDING MACHINE WITH DOUBLE CHECK VALVE

(71) Applicant: KRONES AG, Neutraubling (DE)

(72) Inventors: Thomas Hoellriegl, Teublitz (DE); Benedikt Hengl, Essing (DE); Konrad Senn, Alteglofsheim (DE); Armin Buess, Regensburg (DE)

(73) Assignee: KRONES AG

( * ) Notice: Subject to any disclaimer, the term of this patent is extended or adjusted under 35 U.S.C. 154(b) by 0 days.

(21) Appl. No.: 16/824,566

(22) Filed: Mar. 19, 2020

(65) Prior Publication Data
US 2020/0298460 A1 Sep. 24, 2020

(30) Foreign Application Priority Data
Mar. 19, 2019 (DE) .................... 10 2019 107 013.9

(51) Int. Cl.
*B29C 49/42* (2006.01)
(52) U.S. Cl.
CPC ................ *B29C 49/4289* (2013.01)
(58) Field of Classification Search
CPC .................. B29C 49/4289; B29C 49/4284
See application file for complete search history.

(56) References Cited

U.S. PATENT DOCUMENTS

| 3,312,445 A | 4/1967 | Trombatore et al. | |
| 2008/0128958 A1 | 6/2008 | Litzenberg et al. | 264/523 |
| 2015/0042021 A1* | 2/2015 | Schmid | B29C 49/783 264/526 |
| 2020/0238588 A1 | 7/2020 | Finger et al. | B29C 49/06 |

FOREIGN PATENT DOCUMENTS

| DE | 559913 | 2/1929 | |
| DE | 21 2006 000 106 | 9/2009 | ............. B29C 49/78 |
| DE | 10 2011 110 962 | 2/2013 | ............. B29C 49/42 |
| DE | 10 2017 114 138 | 12/2018 | ............. B29C 49/78 |
| EP | 0 838 596 | 4/1998 | ............. F15B 13/042 |
| WO | WO-2007041873 A1 * | 4/2007 | ............ F16K 31/423 |

OTHER PUBLICATIONS

German Search Report (w/machine translation) issued in application No. 10 2019 107 013.9, dated Feb. 14, 2020 (17 pgs).
European Search Report issued in EP Appln. Serial No. 20163559.6-1014, dated Jul. 24, 2020, with machine English translation, 8 pages.

* cited by examiner

*Primary Examiner* — Robert B Davis
(74) *Attorney, Agent, or Firm* — Hayes Soloway P.C.

(57) ABSTRACT

Disclosed is a machine for reshaping plastic preforms into plastic containers with at least one reshaping station, which has a blow moulding arrangement inside which plastic preforms can be reshaped into plastic containers by application of a flowable medium, and with an application device which is configured for applying a flowable medium to the plastic preforms, and with a valve arrangement with at least two valve devices which is configured for feeding the flowable medium under at least two different pressures to the plastic preform during the reshaping thereof. At least one valve device has at least one valve piston which is movable with respect to a valve housing between two valve positions, and a check piston which is movable between at least two positions is arranged on this valve piston.

8 Claims, 4 Drawing Sheets

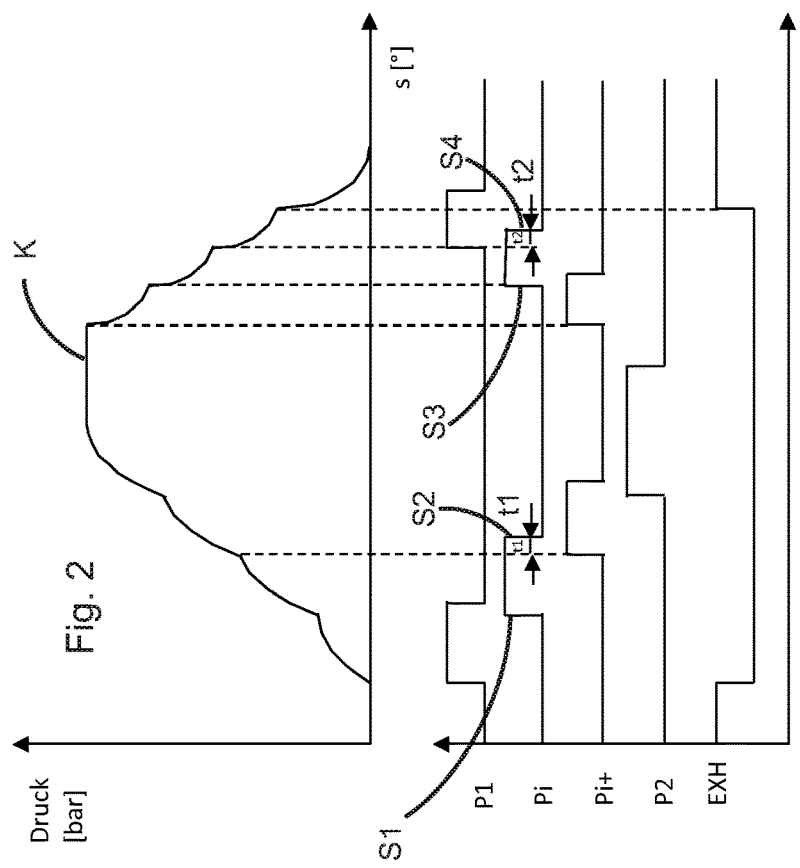
Fig. 2
Fig. 3
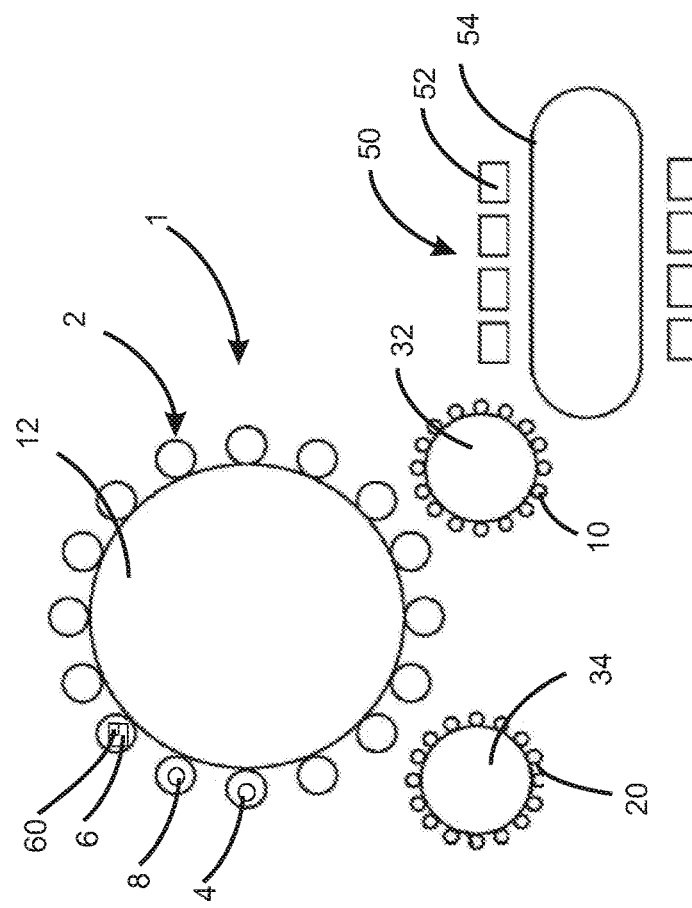
Fig. 1

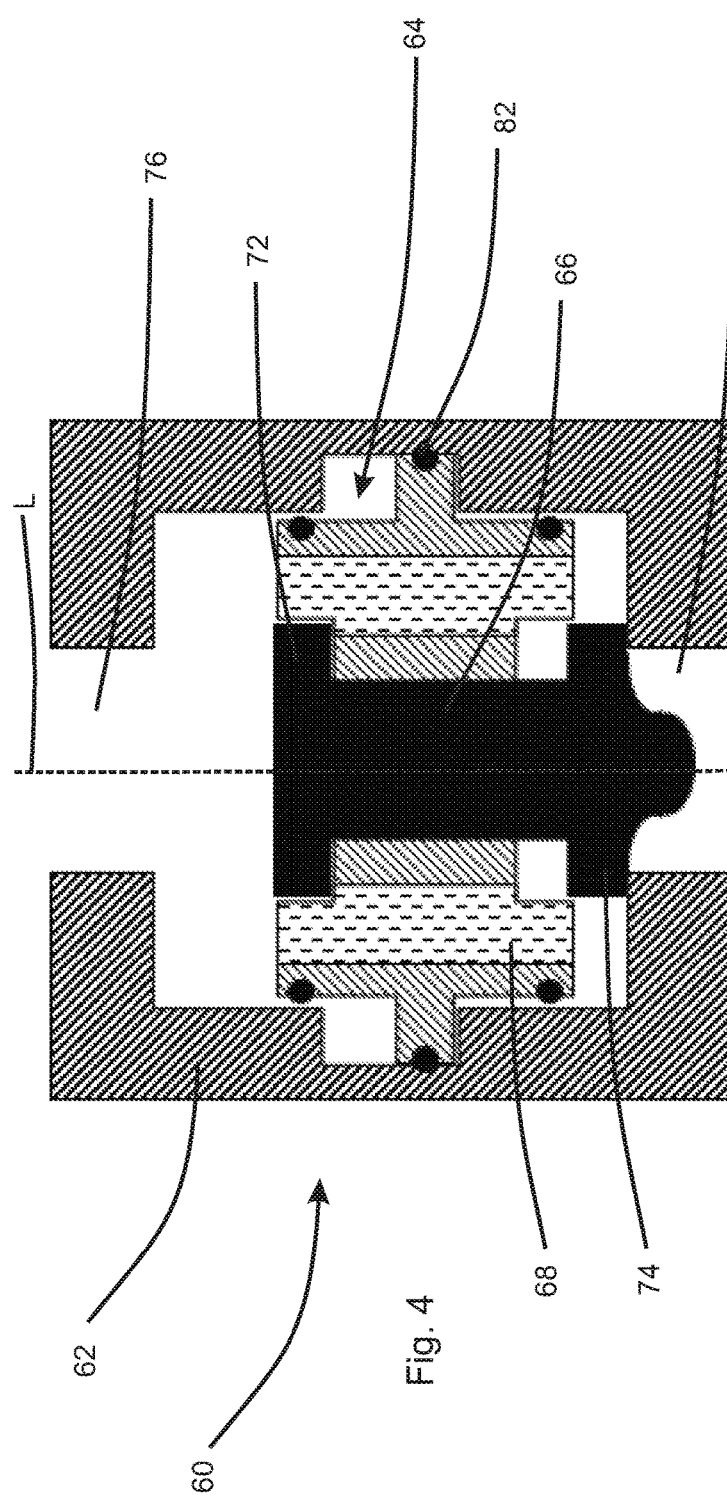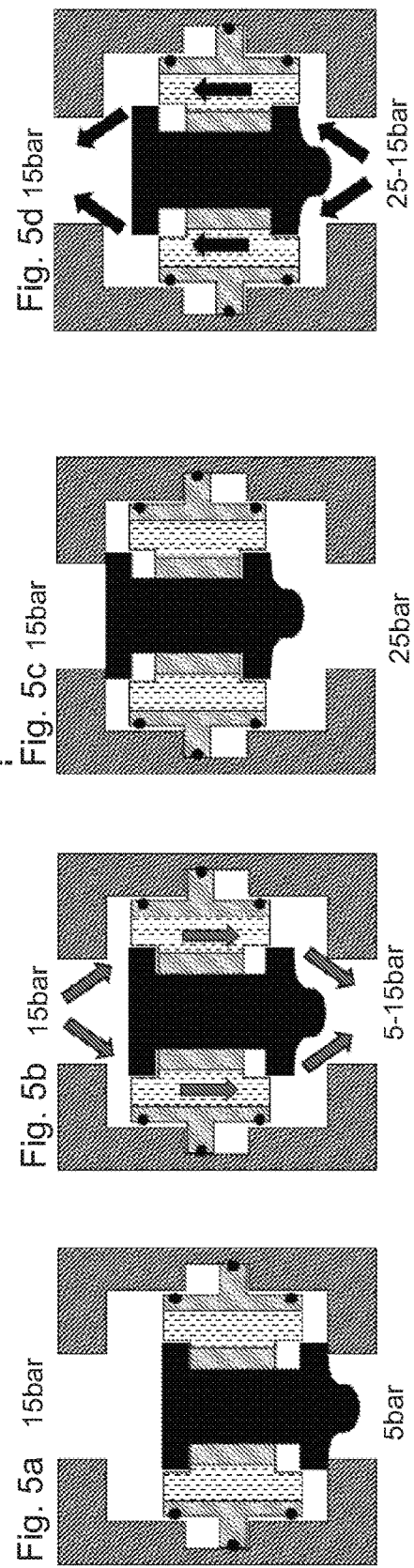

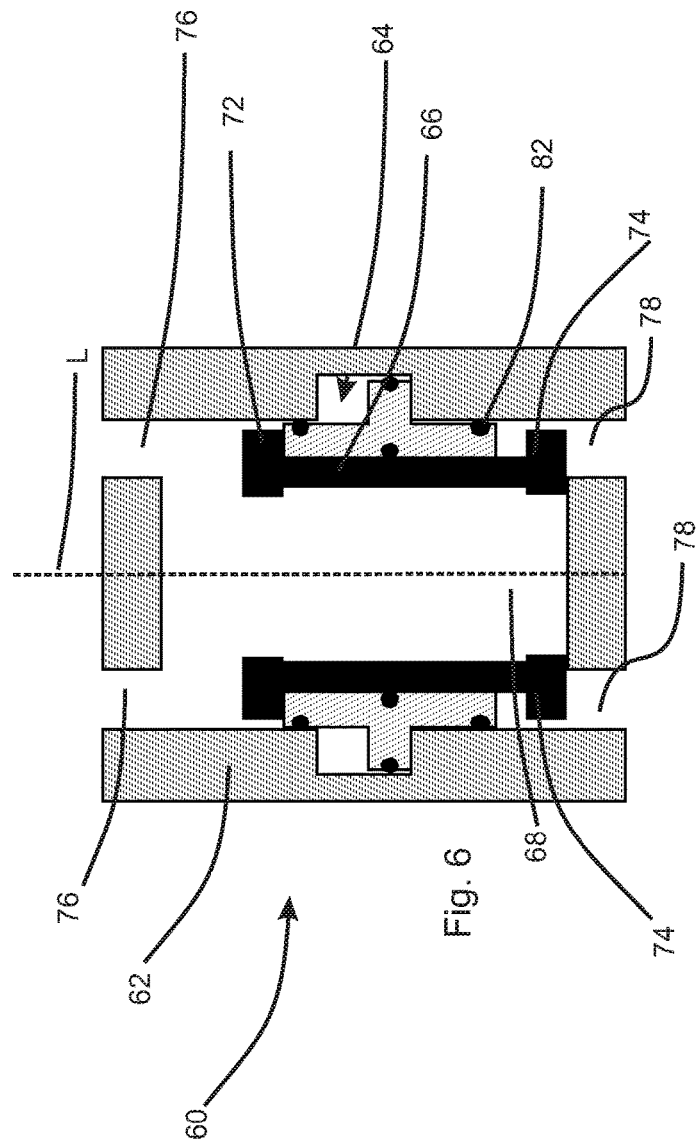
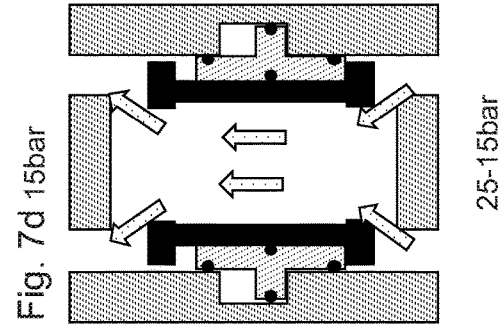
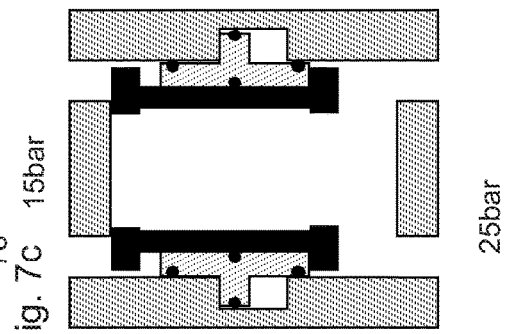
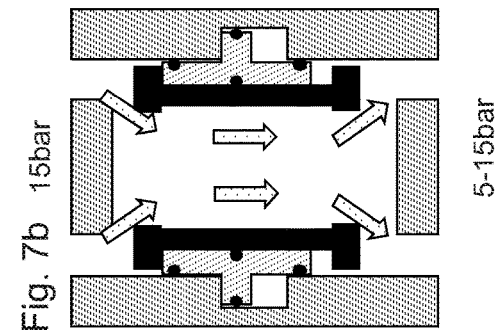
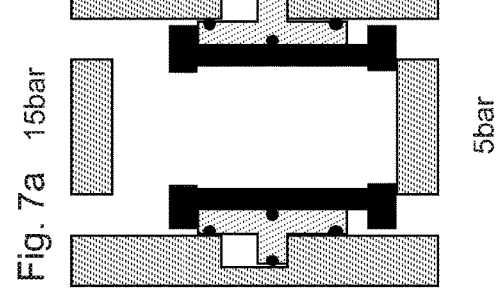

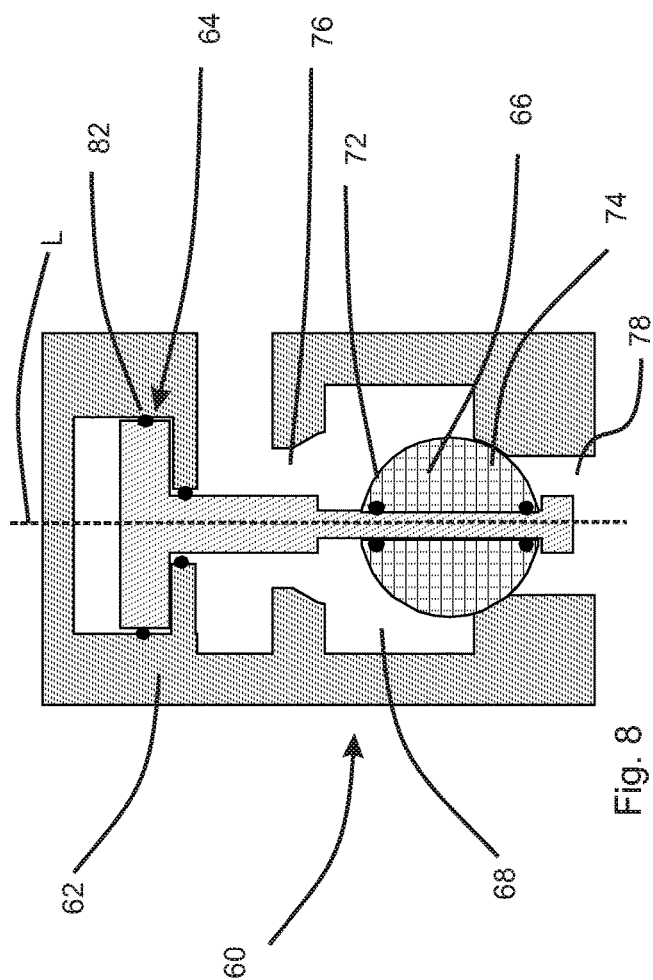
Fig. 8
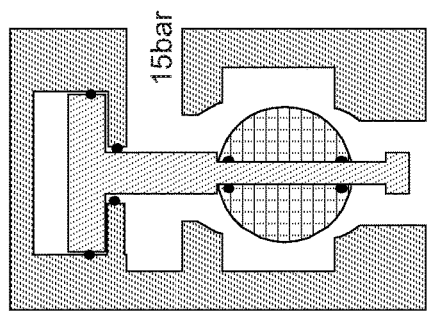
Fig. 9d 25-15bar
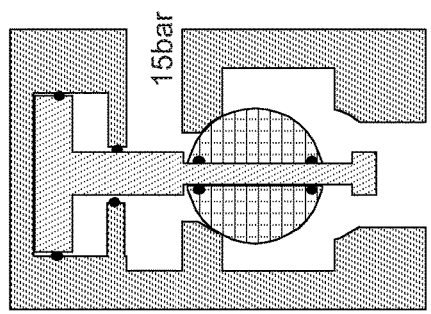
Fig. 9c 25bar
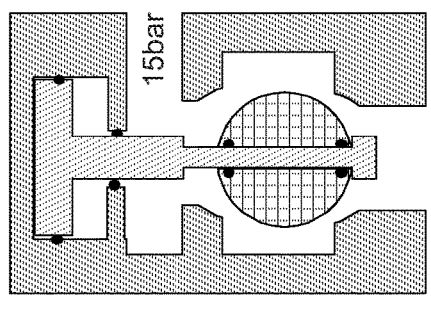
Fig. 9b 5-15bar
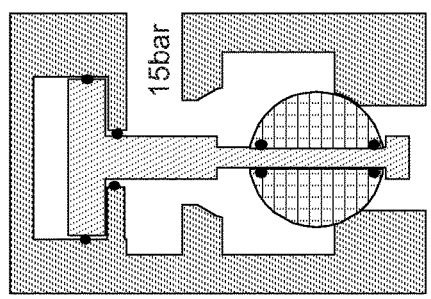
Fig. 9a 5bar

BLOW MOULDING MACHINE WITH DOUBLE CHECK VALVE

BACKGROUND OF THE INVENTION

The present invention relates to a machine and a method for reshaping plastic preforms into plastic containers. Such machines and methods have been known for a long time from the prior art.

In this case it is known that a gaseous medium, such as for instance compressed air, is particularly preferably applied to plastic preforms so that they are expanded into plastic bottles. More recently, machines and methods have become known in which the plastic preforms are filled with liquid and in particular with a beverage to be bottled.

The present invention relates to both types of machines. In the prior art it is conventional that different pressure stages are applied to the plastic preforms during the reshaping process. Thus, for example, first of all a preliminary blow moulding pressure, then a higher second blow moulding pressure (for example the so-called intermediate blow moulding pressure) and finally also with an even higher final blow moulding pressure, can be applied to the preforms.

For this purpose, a plurality of valves are usually switched. First of all, a valve for the preliminary blow moulding pressure is opened, then this is closed again, then a further valve for an intermediate blow moulding pressure is opened and closed again and finally a valve for a final blow moulding pressure is opened.

After the expansion of the plastic preforms, these valves are switched again in the reverse order.

Due to the respective switching processes small time delays occur, which can have a negative effect on the production of the plastic containers. Correspondingly a machine is known from DE 21 2006 000 106 U1 in which the valves are opened, but are closed again automatically by additional check valves. In this way the switching times are reduced overall for the process.

In this case the use of two separate check valves is proposed in this document, which makes the arrangement relatively costly.

The object of the present invention therefore is to provide a machine for transforming plastic preforms into plastic containers which can be achieved in particular with less effort.

SUMMARY OF THE INVENTION

A machine according to the invention for transforming plastic preforms into plastic containers has at least one reshaping station which has a blow mould arrangement within which plastic preforms can be reshaped into plastic containers by application of a flowable medium. Furthermore, the machine has an application device which is suitable and intended for applying a flowable medium to the plastic preforms, as well as a valve arrangement having at least two valve device which are suitable and intended for feeding the flowable medium under at least two different pressures to the plastic preform during the reshaping thereof.

According to the invention at least one valve device has at least one valve body which is movable with respect to a valve housing between two valve positions, and a check element, for instance a movable check piston, which is movable between at least two positions is arranged on this valve body. Preferably, therefore, this check piston is movable relative to the valve body.

It is pointed out that, in the following, the term "check piston" is used for the check element. In this case this term generally excludes such elements which under the action of a pressure change are pushed into a specific position and/or which are suitable and intended for blocking a media throughflow at least partially and preferably completely.

In this case this check element can have the geometric configuration of a piston but also other configurations, such as for instance the configuration of a ball, half-sphere or the like. The machine preferably has a seat for the check element. In addition, the check element can also be designed as a tubular body, which preferably serves on the one hand for directing the flowable medium and on the other hand for closing sections of the valve device.

Thus, a valve device is proposed, which on the one hand constitutes a switchable valve and additionally also performs the operation of a check valve. In a preferred embodiment a plurality of such valve devices can be arranged approximately in a plane, the normal of which extends (substantially) parallel to the central axis of the plastic container.

As mentioned above, the free-flowing medium is in particular a gaseous medium. Particularly preferably, the reshaping station is arranged on a movable support and in particular on a rotatable support. The device particularly preferably has a plurality of the said reshaping stations which are arranged on the movable and in particular rotatable support. Preferably all these reshaping stations are designed in the manner described above.

In a further advantageous embodiment, the application device has blowing nozzle which in particular can be placed onto a mouth of the plastic preform. In this case this blow moulding die is supplied with blowing air, which is guided via the above-mentioned valve devices.

In a further preferred embodiment, the at least one reshaping station also has a rod-like body and in particular a so-called stretching rod which can be introduced into the plastic preform in order to expand this container in its longitudinal direction.

In a further advantageous embodiment, the second valve device is also designed in the above-mentioned manner, that is to say as a valve which has a check function.

In a further advantageous embodiment, the two pistons, that is to say on the one hand the valve piston and on the other hand the check piston, are movable in the same direction of movement. In this case it is possible that these two pistons are also rotationally symmetrical and in particular rotationally symmetrical with respect to the same axis of symmetry.

In a further advantageous embodiment, it is conceivable that the valve piston is guided through the valve housing. Furthermore, the check piston is preferably guided by the valve piston.

In a further preferred embodiment at least one first sealing means, such as for instance a piston seal, is provided, which seals the valve piston relative to the valve housing. In a further preferred embodiment at least one second sealing means, such as for instance a piston seal, is provided, which seals the check piston relative to the valve housing.

Therefore, in a further advantageous embodiment the check piston extends at least partially inside the valve piston.

In a preferred embodiment the machine has a pressure reservoir which provides the flowable medium and the valve device is arranged between this pressure reservoir and the application device. In this case this pressure reservoir can be for example an annular conduit which is suitable and intended for storing the flowable medium.

Advantageously the machine has a plurality of such pressure reservoirs, in which the flowable medium can be stored in particular under different pressures. In this case a plurality of these pressure reservoirs can be connected to a plurality of these valve devices described above. In this case it is also possible that during the production process pressure is again recycled into these annular channels and in particular into annular channels with lower pressure. In this way a saving can be made overall on the compressed air. The said valve devices can also be used for this purpose.

In a further preferred embodiment, the first valve piston can be switched to active. This means that the valve piston can be switched in particular at required times connected or can be displaced from a first position into a second position. In this case this valve piston may be switchable for example pneumatically or also electrically.

Preferably the check piston is not switchable to active, but a switching of the check piston or a movement of the check piston relative to the valve piston is effected by pressure conditions. The check piston can preferably be moved solely by the influence of the gaseous medium.

In a further preferred embodiment, a tensioning element, in particular a spring element and/or a damper element can be provided, which pretensions the check piston in a specific direction and/or in a specific position (for instance a central position with respect to the valve piston). In this way an uncontrolled shaking and/or wobbling of the check piston can be prevented or at least reduced.

Preferably, the check element is formed as a single part. However, a multi-part design of the check element would also be conceivable.

In a further advantageous embodiment, the valve device performs a check valve function for both flow directions of the flowable medium. Thus, the valve device is preferably designed as a double check valve.

Thus it is possible that this double check valve can be set for one flow direction in a first valve position of the valve piston and a specific first position of the check valve piston and the second check function can be set for the reverse flow direction of the flowable medium in other valve positions of the valve piston and of the check piston. Preferably there is a valve position of the valve piston as well as the check piston, in which the valve is closed in one flow direction and there is a valve position of the piston as well as the check piston, in which the valve is closed in the other flow direction of the flowable medium.

In a further preferred embodiment, the machine has a sensor device which detects and/or monitors a position of the valve piston and/or of the check piston. This sensor device preferably transmits at least one value which is characteristic for the position of the valve piston and/or of the check piston.

In this way statements can be made about a present and/or future behaviour of the valve device. In particular in this way for instance a predictive maintenance or also a condition monitoring is possible.

Furthermore, the present invention is directed to a valve device, in particular a machine of the type described above. In this case the valve device has at least one valve piston which is movable between two valve positions with respect to a valve housing and also a check piston which is movable on this valve piston between at least two positions, wherein in a valve position of the valve piston and also of the check piston the valve device is closed in one flow direction and in a valve position of the valve piston and also of the check piston the valve is closed in the other flow direction. Thus, the valve device can preferably serve in both flow directions as a check valve.

In a preferred embodiment the valve device has a flow channel for directing the flowable medium, wherein this flow conduit extends between the check piston and the housing wall. Thus, a flow conduit is preferably provided which directs the flowable medium around the check piston. This conduit preferably surrounds the check piston.

In a further preferred embodiment, the valve piston is arranged in a separate valve piston compartment and is mechanically connected to the check piston.

It is pointed out that the check piston does not necessarily have to be designed as a piston in the narrower sense, but generally as a closure element which acts as a check piston.

In a further preferred embodiment, the valve piston is designed as a tubular body. In this instance the circumferential wall of this tubular body can serve as a closure element.

In a further advantageous embodiment the check piston has a first closure element which is suitable and intended for blocking a flow of the flowable medium in a first flow direction and a second closure element which is suitable and intended for blocking a flow of the flowable medium in a second flow direction. In this case these flow directions are preferably opposed to one another. These two closing devices are preferably arranged on the common support and thus are preferably coupled (in particular rigidly) to one another.

Preferably at least one closure element can be placed on at least one access opening in order to close this opening. This access opening is advantageously formed in the valve housing.

The second closure element is also preferably arranged on an opening or an access opening. This second opening can also preferably be closed by this closure element.

In a preferred embodiment is a movement of the check piston is coupled to a movement of the valve piston at least at times. In a preferred embodiment a movement of the check piston is decoupled from a movement of the valve piston at least at times.

This means that the check piston is carried along by a movement of the valve piston at least at times. Preferably the check piston is carried along by the active movement of the valve piston. The check piston preferably moves in order to realise a check function relative to the valve piston.

In a further preferred embodiment, the check piston is movable in at least three and preferably in at least four positions or situations relative to the valve housing.

Preferably, in each of the positions of the valve piston opposite to the housing the check piston can be positioned in two different positions opposite to the valve piston. These positions are in particular positions in which the check piston remains fixed relative to the valve housing and in which in particular a specific function of the valve device is undertaken, such as for instance a check function.

In a further preferred embodiment, the valve piston has at least one stop, and preferably at least two stops, to which at least one element of the check piston can be applied.

The valve piston preferably has a cutout, into which an element of the check piston and in particular a closure element of the check piston can enter. In this way the valve device can be constructed in a more space-saving manner.

Furthermore, the present invention is directed to a method for reshaping plastic preforms into plastic containers, wherein the plastic preforms are reshaped into plastic containers by means of an application device by application of a flowable medium, and wherein the flowable medium is fed under at least two pressures to the plastic preforms by means of at least two valve devices.

According to the invention at least one valve device has at least one valve piston, which is moved with respect to the valve housing between two valve positions, and a check piston arranged on this valve piston is arranged is moved between at least two positions in particular relative to the valve piston.

In a preferred embodiment the valve device shuts off, at least at times, the flow of the flowable medium in a first flow direction, and the valve device shuts off, at least at times, the flow of the flowable medium in a second flow direction.

These two directions are preferably opposed to one another.

The valve device preferably shuts off the flow of the medium in one flow direction during an expansion process of the plastic preform and the valve device shuts off the flow of the flowable medium in the opposing flow direction during a pressure relief phase of the plastic container.

In an advantageous embodiment, for expanding the plastic preforms, a plurality of the aforementioned valve devices are connected one behind the other.

In this case a first pressure can initially be applied to the plastic preforms. Then a higher pressure is applied to the plastic preforms. For this purpose, a valve device according to the invention is switched or opened.

In this case this switching takes place actively, that is to say it is in particular driven. At a later time, the valve is closed again, wherein this switching with the valve device according to the invention preferably takes place passively, that is to say it is effected by the pressure conditions which ensue in the active switching of a further valve. This passive switching operation of the valve device takes place with a time delay for the active switching operation of a further valve device. This results in a time delay t1, in which the two valves are at least partially opened concurrently. This switching logic can preferably be applied at all switching stages during the pressure buildup.

In addition, a corresponding switching logic can be used when the container is relieved of pressure. Here too, for instance, first of all a specific valve device which is responsible for switching to a higher pressure is switched actively in order to recycle compressed air. Then a further valve device can be switched and in particular this valve device can be opened. The first aforementioned valve device can in particular be closed passively by the pressure conditions.

Further advantages and embodiments are disclosed by the appended drawings.

BRIEF DESCRIPTION OF THE DRAWINGS

In the drawings:

FIG. 1 shows a schematic representation of a machine for transforming plastic preforms into plastic containers;

FIG. 2 shows a representation of a pressure curve shape;

FIG. 3 shows a representation of a switching profile of individual valves;

FIG. 4 shows a schematic representation of a valve device according to the invention;

FIGS. 5a-5d show four positions of the valve device shown in FIG. 4;

FIG. 6 shows a schematic representation of a valve device according to the invention in a further embodiment;

FIGS. 7a-7d show four positions of the valve device shown in FIG. 6;

FIG. 8 shows a schematic representation of a valve device according to the invention in a further embodiment; and FIGS. 9a-9d show four positions of the valve device shown in FIG. 8;

DETAILED DESCRIPTION OF THE INVENTION

FIG. 1 shows a schematic representation of a machine 1 for reshaping plastic preforms into plastic containers. In this case plastic preforms 10 are first of all heated in a heating device 50. For this purpose, the heating device 50 has a plurality of heating elements 52, which are arranged stationary, as well as a transport device 54, which transports the plastic preforms individually past the heating devices in order to heat them.

A transport device 32 adjoins this heating device 50. This transport device is in particular a transport starwheel. This transport device 32 transports the plastic preforms 10 to the actual reshaping device 1.

The reference 34 designates a further transport device, which transports the shaped containers away from the reshaping device 1.

The reshaping device 1 has a rotatable support 12 on which a plurality of transforming stations 2 are arranged. These reshaping stations 2 are configured in substantially the same way.

Each of these reshaping stations 2 has an application device 8 (only schematically illustrated), such as for instance a blow moulding die, which can be placed onto a mouth of the plastic preforms, in order to apply a flowable medium and in particular compressed air to the preforms.

The reference sign 4 designates a blow moulding arrangement within which the plastic preforms are expanded to form the plastic containers. This blow moulding arrangement is preferably constructed in multiple parts and in particular has at least two parts and a base part which are moved with respect to one another for opening and closing.

In addition, each reshaping station has a valve arrangement 6, for example a so-called valve block, which has a plurality of valve devices 60.

FIG. 2 shows a typical pressure curve shape during expansion of the plastic preforms according to the prior art. It will be recognised that increasing pressures are applied to the plastic preforms. Then the pressures are separately reduced again and in some instances compressed air is recycled in annular channels with a lower pressure level.

FIG. 3 shows typical switching positions of the individual valves. In this case it is recognised that a pressure P1 is first of all applied to the plastic preforms. Pi follows as the next higher pressure stage. For this purpose, a valve device according to the invention is switched or opened, as illustrated by the reference S1. In this case this switching S1 takes place in actively, that is to say is in particular driven. At a later time the valve is closed again, wherein this switching S2 with the valve device according to the invention takes place passively, that is to say it is effected by the pressure conditions which ensue in the active switching of the Pi+ valve. This passive switching operation S2 of the Pi valve takes place with a time delay for the active switching operation of the Pi+ valve. This results in a time delay t1, in which the Pi and Pi+ valves are at least partially opened concurrently. This switching logic can preferably be applied at all switching stages during the pressure buildup.

An intermediate blow moulding pressure Pi+ follows this pressure Pi where applicable. Then with the pressure P2 a final blow moulding of the plastic preforms or the then already existing plastic containers takes place, in order to form these completely.

In the further course of events, the valves are switched again in the reverse sequence, in order thus also to recover compressed air in other annular channels. Lastly an outlet valve EXH is also opened, in order to discharge remaining compressed air from the system and in order then to be able to remove the finished formed plastic containers.

Thus due to the double check valve described here a respectively next pressure stage (the next higher pressure stage in the case of blow moulding or the next lower pressure stage in the case of recycling) and thus the next process piston can already be switched to active without the process piston of the preceding process valve having to be switched to active. A check piston can close independently, as described above. In a reversal of the pressure conditions, this can also take place in the process valve. In this way, as indicated by the references S2 or S4, savings can be made in one case of each active switching operation.

In this way a significantly steeper pressure curve can be achieved in both directions. This increases the quality of the container, because the plateau phases visible in FIG. 2 disappear for the most part. By the integration of the check function in the process piston or valve piston only one check piston is required for both throughflow directions.

FIG. 4 shows a schematic representation of a valve device according to the invention. This has a valve housing 62, inside which a valve piston 64 here is movable between two positions in the vertical direction or a longitudinal direction L of the valve housing, which extends between two openings 76 and 78, through which the flowable medium flows.

By means of a sealing device, such as for instance a piston seal 82, the valve piston 64 is sealed off relative to the valve housing 62. Thus, the valve piston 64 is also guided through the valve housing 62. The reference 66 designates a check piston, which likewise here is movable in the vertical direction L between two positions. This check piston 66 is guided through the valve piston 64.

The reference numeral 68 designates guide channels through which the flowable medium can flow.

The check piston 66 has two closure elements 72 and 74 which each implement the check function. These can block accesses 76 and 78 of the valve device 60. In this case this blocking preferably takes place in two end positions of the check piston 66.

FIGS. 5a to 5d show four situations of the illustrated valve device. In the situation illustrated in FIG. 5a the valve piston 64 is in a closed position. Here (for example) 5 bars can prevail in the container and 15 bars in the annular supply conduit. Therefore, here too the check piston 66 is in a closed position.

In the situation illustrated in FIG. 5b the valve piston 64 is actively switched in the upper position. This can take place regardless of the prevailing pressure conditions. Now the valve is opened and air can flow downwards from above. The container is now filled with the pressure of 15 bars.

In the situation shown in FIG. 3 a subsequent process valve has been switched and thus a higher pressure of in this case 25 bars now prevails on the valve device 60. This causes the check piston 66 to be brought into a closed position. Thus, in the situation shown in FIG. 5c, an automatic closing of the valve or the inflow conduit.

In the situation shown in FIG. 5d, in turn the valve piston is switched to active (for opening of the valve device). Here the check piston 66 is entrained downwards and thus is brought into a middle position. Thus, here the valve is in an open position.

In a subsequent step the situation illustrated in FIG. 5a is reached. The pressure in the container drops due to the opening of a subsequent process valve (lower pressure level). Thus, at some point the pressure in the container is lower than in the annular conduit and the check piston automatically closes in the lower position illustrated in FIG. 5a.

FIG. 6 shows a valve device of a further embodiment according to the invention. In this embodiment the check piston 66 is designed as a tubular body which forms the guide channel 68 in its interior.

The closure elements 74 and 72 here are formed on the circumferential walls of this tubular body. The valve housing 62 has two annular access openings 76 and 78.

In turn FIGS. 7a-7d show switching positions of the valve device shown in FIG. 6. These correspond to the switching positions from FIGS. 5a-5d so that reference is made to the description above.

FIG. 8 shows a valve device in a further embodiment according to the invention. In this embodiment the check piston 66 is designed as a spherical body, wherein the surface of this spherical body forms both the closure elements 72 and also the closure elements 74. These closure elements in turn can close the accesses 76 and 78 which form a valve seat here.

Here the valve piston 64 is accommodated in a separate valve compartment.

FIGS. 9a-9d in turn show switching positions of the valve device shown in FIG. 8. These correspond to the switching positions from FIGS. 5a-5d so that reference is made to the description above.

The applicant reserves the right to claim all the features disclosed in the application documents as essential to the invention in so far as they are individually or in combination novel over the prior art. Furthermore, it is pointed out that in the individual drawings, features were also described which may be advantageous per se. The person skilled in the art recognises immediately that a specific feature described in a drawing may also be advantageous without the incorporation of further features from this drawing. Furthermore, the person skilled in the art recognises that advantages may also result from a combination of several features shown in individual drawings or in different drawings.

LIST OF REFERENCES 1 reshaping device
2 transforming stations
4 blow moulding arrangement
8 application device
6 valve arrangement
10 plastic preforms
12 rotatable support
32 transport device
50 heating device
52 heating elements
54 transport device
60 valve devices
62 valve housing
64 valve piston
66 check piston
68 guide channels
72 closure element
74 closure element 76 access to the valve device
78 access to the valve device
82 sealing device
EXH outlet valve
P1 pressure
P2 pressure
Pi intermediate blow moulding pressure
Pi+ further intermediate blow moulding pressure
S1 active switching of the valve device during pressure buildup
S2 passive switching of the check piston during pressure buildup
S3 active switching of the valve device during recycling
S4 passive switching of the check piston during recycling

The invention claimed is:

1. A machine for reshaping plastic preforms into plastic containers with at least one reshaping station, which has a blow moulding arrangement inside which plastic preforms can be reshaped into plastic containers by application of a flowable medium, and with an application device which is configured for applying a flowable medium to the plastic preforms, and with a valve arrangement with at least two valve devices which is configured for feeding the flowable medium under at least two different pressures to the plastic preform during the reshaping thereof, wherein at least one valve device has at least one valve piston which is movable with respect to a valve housing between two valve positions, and a check element which is movable between at least two positions is arranged on this valve piston, and wherein the valve device is configured to perform a check valve function for both flow directions of the flowable medium.

2. The machine according to claim 1, wherein the machine has a pressure reservoir configured to provide the flowable medium and the valve device is arranged between this pressure reservoir and the application device.

3. The machine according to claim 1, wherein the first valve piston is actively switchable.

4. A valve device for a machine as claimed in claim 1, wherein the valve device has at least one valve piston which is movable with respect to a valve housing between two valve positions, and a check element which is movable between at least two positions is arranged on the valve piston, wherein in a valve position of the valve piston and of the check element the valve device is closed in one flow direction, and in a valve position of the valve piston and of the check piston the valve is closed in the other flow direction, and wherein the check element has a first closure element which is configured for blocking a flow of the flowable medium in a first flow direction and a second closure element which is configured for blocking a flow of the flowable medium in the second flow direction.

5. The value device according to claim 4, wherein the valve device has a flow channel configured for directing the flowable medium, wherein the flow channel extends between the check element and the housing wall and/or extends through the check element.

6. The value device according to claim 4, wherein the check element can be positioned in at least three positions relative to the valve housing.

7. The machine according to claim 2, wherein the first valve piston is actively switchable.

8. The value device according to claim 5, wherein the check element can be positioned in at least three positions relative to the valve housing.

* * * * *